United States Patent [19]

Chiang

[11] Patent Number: 5,319,993
[45] Date of Patent: Jun. 14, 1994

[54] STEERING BEARING ASSEMBLY FOR A BICYCLE

[75] Inventor: Douglas Chiang, Taichung Hsien, Taiwan

[73] Assignee: Tien Hsin Industries Co., Ltd., Taichung Hsien, Taiwan

[21] Appl. No.: 115,866

[22] Filed: Sep. 2, 1993

[51] Int. Cl.$^5$ ............................................. B62K 21/12
[52] U.S. Cl. .................. 74/551.1; 280/279; 403/90; 384/545
[58] Field of Search ................ 74/551.1–551.8; 280/279, 275, 276, 277, 278, 280; 403/24, 88, 90, 344; 384/545

[56] References Cited

U.S. PATENT DOCUMENTS

| | | | |
|---|---|---|---|
| 3,304,099 | 2/1967 | Jankowski | 74/551.1 |
| 3,306,684 | 2/1967 | Klein | 280/279 X |
| 5,095,770 | 3/1992 | Rader | 280/279 X |
| 5,224,396 | 7/1993 | Lobbezoo et al. | 403/344 |
| 5,246,296 | 9/1993 | Chi | 280/279 X |
| 5,247,852 | 9/1993 | Guer | 74/551.8 |
| 5,251,995 | 10/1993 | Chi | 280/279 X |

FOREIGN PATENT DOCUMENTS 2379423  10/1978  France ................ 74/551.1

*Primary Examiner*—Vinh T. Luong
*Attorney, Agent, or Firm*—Marshall & Melhorn

[57] ABSTRACT

A steering bearing assembly includes a head tube, a steerer tube that has a first end which is connected to a front fork of a bicycle and which extends through the head tube, and a bearing assembly disposed between the head tube and the steerer tube. A truncated cone-shaped inserter is disposed in a second end of the steerer tube and has an axially extending threaded bore formed therethrough. A C-shaped resilient member with an inner tapered wall is press-fitted into the steerer tube above the inserter. A threaded bolt is disposed on the second end of the steerer tube and is threaded into the inserter. When the threaded bolt is tightened, the resilient member expands radially to abut frictionally against the steerer tube and to compress downward simultaneously a stem that is disposed on the head tube around the steerer tube.

2 Claims, 5 Drawing Sheets

STEERING BEARING ASSEMBLY FOR A BICYCLE

BACKGROUND OF THE INVENTION

1. Field of the Invention

The invention relates to a bicycle frame, more particularly to a steering bearing assembly for connecting a front wheel and handle bars to the bicycle frame.

2. Description of the Related Art

FIGS. 1 to 4, illustrate a steering bearing assembly of a bicycle frame according to U.S. Pat. No. 5,095,770 which is used to connect a front wheel and handle bars to the bicycle frame. The steering bearing assembly includes a steerer tube 33, one end of which is connected to a fork 31 that carries the front wheel 13, a head tube 21 that is connected fixedly to a top tube 19 and a down tube 23 of the bicycle, and a stem 37 that carries the hand bars 15.

The steerer tube 33 extends through the head tube 21 and through a connector 35 of the stem 37. In order for the steerer tube 33 to rotate relative to the head tube 21, a lower bearing assembly 47 and an upper bearing assembly 49 are mounted between the steerer tube 33 and the head tube 21. The upper bearing assembly 49 is located at an upper end of the head tube 21 and includes a first race 57 and a second race 59 which encase cooperatively a plurality of ball bearings 61. The first and second races 57, 59 are supported to rotate relative to each other by the ball bearings 61. The first race 57 is fixedly connected with the head tube 21 so that it rotates with the same. The second race 59 has an inner diameter that is greater than an outer diameter of the steerer tube 33 so that the steerer tube 33 is carried by the upper bearing assembly 49 with a clearance formed between the second race 59 and the steerer tube 33. The second race 59 has an annular contact face 63 which tapers at an angle with respect to a longitudinal axis 65 of the steerer tube 33.

An annular compression ring 67 with a gap 69 is disposed above the second race 59 of the bearing assembly 49. The compression ring 67 has an upper surface 71 and a tapered contact surface 75 which matches the contact face 63 of the second race 59 in the bearing assembly 49.

When all of the elements are in place, an adjuster nut 79 is threaded to an internally threaded upper end 77 of the steerer tube 33. At this stage, a head 83 of the adjuster nut 79 contacts an upper end of the connector 35 and forces the latter downward on the steerer tube 33. Longitudinal and radial forces are exerted consequently on the compression ring 67 such that the latter is compressed against the steerer tube 33 and the second race of the bearing assembly 49, thereby locking the compression ring 67 in place on the steerer tube 33.

The above-mentioned steering bearing assembly is advantageous in many aspects. However, it still has a drawback. The internal thread at the upper end of the steerer tube 33 can wear out due to constant vibration of the bicycle when in operation or due to a long period of use. When replacing the steerer tue 33, the user has to disassemble all the connecting parts, such as the stem, the head tube or the like, thus inconveniencing the user.

SUMMARY OF THE INVENTION

A main objective of the present invention is to provide a steering bearing assembly for a bicycle frame which is easy to disassemble, thereby facilitating replacement of a fastening member to fasten a steerer tube and handle bars of the bicycle frame.

According to the present invention, the steering bearing assembly includes a head tube connected securely with a top tube and a down tube of a bicycle frame, a steerer tube connected to a front wheel fork and passing through the head tube, and a bearing assembly provided at an upper end of the head tube. The bearing assembly includes a lower race connected to the head tube, an upper race connected to the steerer tube, and a plurality of ball bearings enclosed between the upper and lower races to permit relative rotation of the two races. The upper race has an inner diameter that is greater than an external diameter of the steerer tube so that a clearance is formed between the upper race and the steerer tube. A compression ring is disposed in the clearance confined by the upper race and the steerer tube. A mounting stem is disposed above the compression ring and around the steerer tube. The mounting stem is used for connecting the handle bars of the bicycle frame to the steerer tube.

A C-shaped resilient member is disposed inside the steerer tube and is formed with an internal tapered wall. A truncated cone-shaped inserter is inserted into the tapered wall of the C-shaped resilient member and is in contact with the tapered wall of the latter. The inserter has an axially extending threaded bore formed therethrough. A threaded bolt with a head is disposed at an upper end of the steerer tube and connects threadedly with the inserter in the threaded bore of the latter. When the threaded bolt is tightened, the inserter is squeezed into the resilient member such that the latter expands radially to abut frictionally against the steerer tube. The stem is simultaneously forced downward by the head of the threaded bolt so as to compress the compression ring against the second race and the steerer tube in order so as to retain the steerer tube vertically relative to the bearing assembly.

In the event that the screw thread in the threaded bore of the inserter wears out, the inserter can be replaced easily by removing the threaded bolt from the steerer tube. There is no need to remove the stem, the head tube and the bearing assembly from the steerer tube as required in the prior art.

BRIEF DESCRIPTION OF THE DRAWINGS

Other features and advantages of the present invention will become more apparent in the following detailed description of the preferred embodiment with reference to the accompanying drawings, in which.

DETAILED DESCRIPTION OF THE PREFERRED EMBODIMENT

Since the construction of a steering bearing assembly of the present invention is generally similar to the steering bearing assembly of U.S. Pat. No. 5,095,770, only the characterizing parts and components which relate to the present invention will be described in the following paragraphs.

Figure 1:
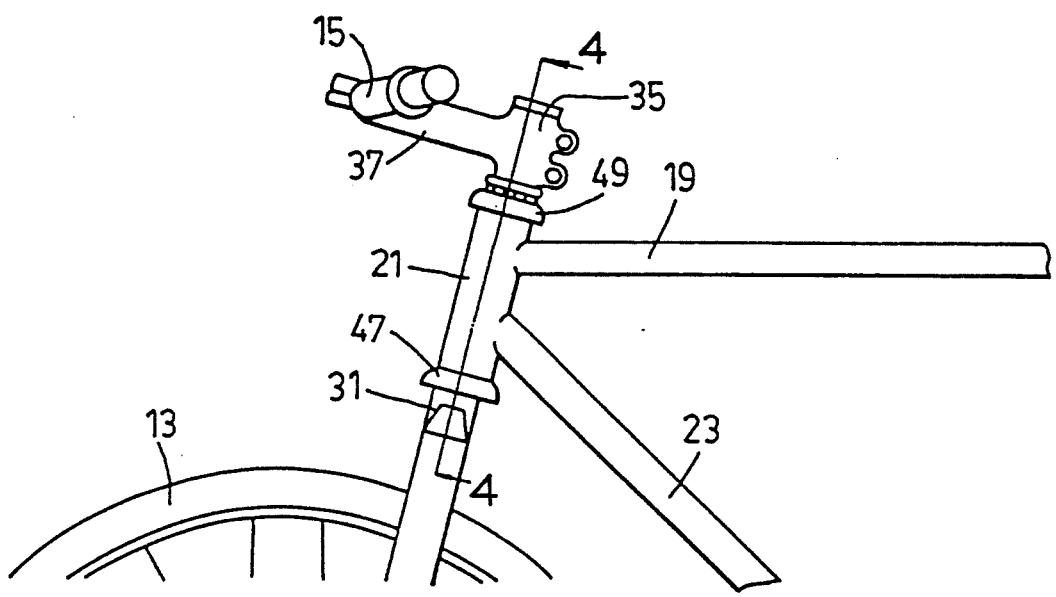
FIG. 1 shows a steering bearing assembly of U.S. Pat. No. 5,095,770 which is used to connect handle bars and a front fork wheel of a bicycle frame.
Figure 2:
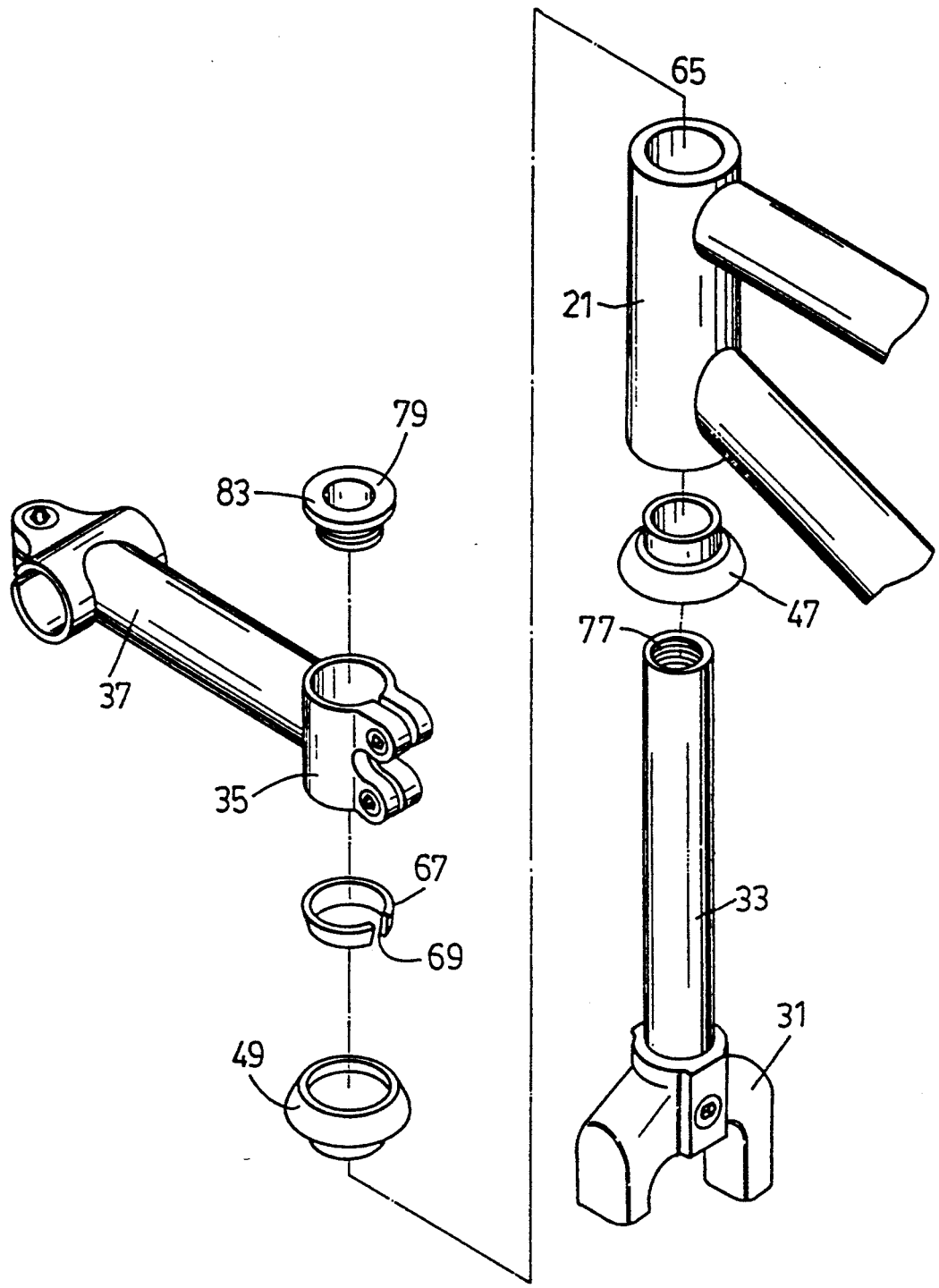
FIG. 2 is an exploded view of the steering bearing assembly in FIG. 1.
Figure 3:
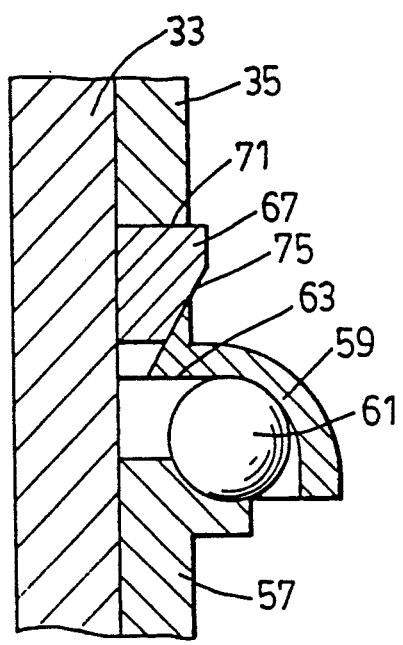
FIG. 3 partially cross sectional view of the steering assembly shown in FIG. 1.
Figure 4:
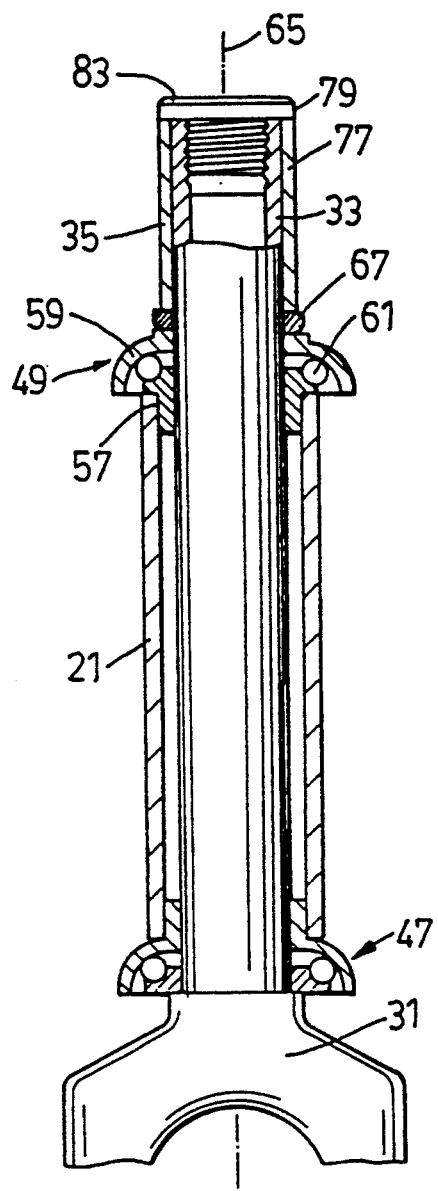
FIG. 4 a cross sectional view of the steering bearing shown in FIG. 1.
Figure 5:
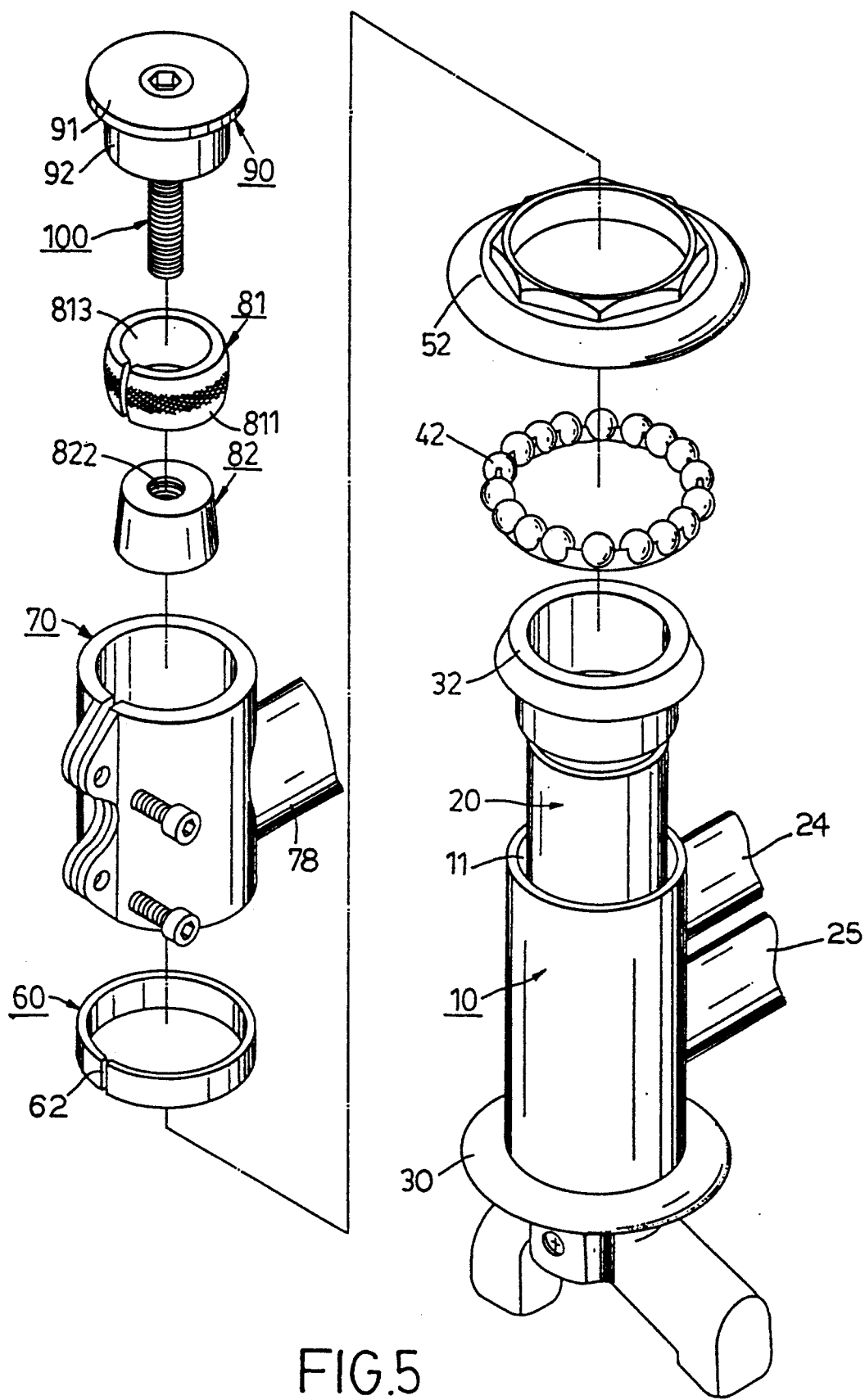
FIG. 5 is an exploded view of a steering bearing assembly of the present invention which is to be used to connect of a front fork wheel and handle bars to a bicycle frame.
Figure 6:
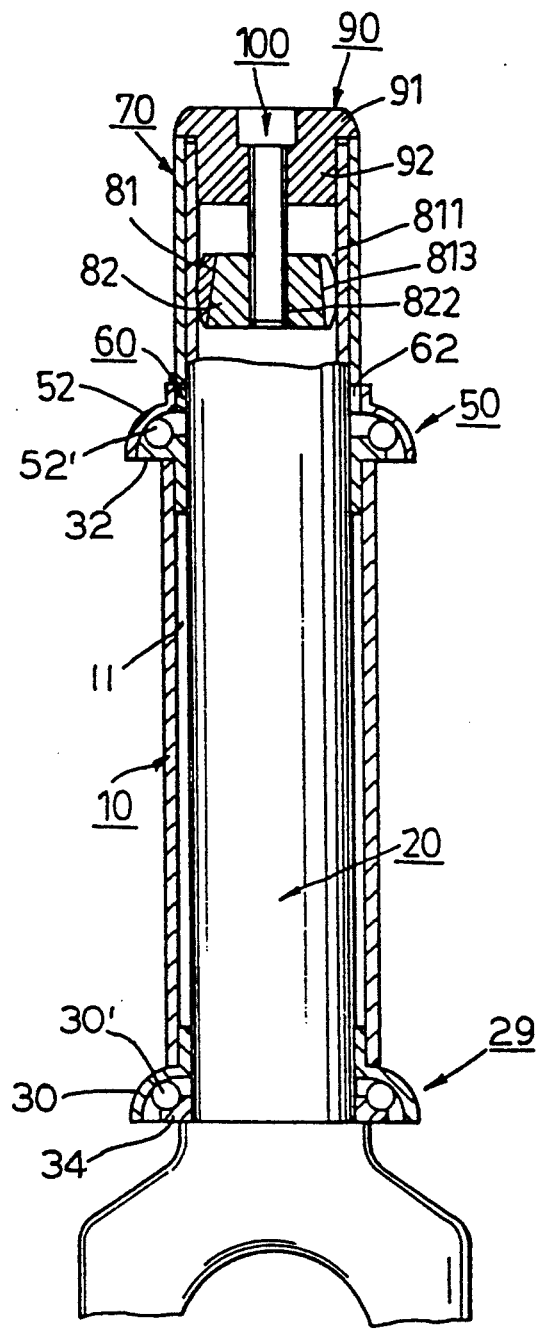
FIG. 6 a cross sectional view of the steering bearing assembly of the present invention.

The steering bearing assembly of the present invention is characterized by the compression member 60 and the fastening member. The compression member 60 is a circular ring with a gap 62 and is easier to fabricate compared to the conventional compression ring 67 shown in FIGS. 1 to 4 because it does not require a tapered contact surface. The fastening member includes a threaded bolt 90, a C-shaped resilient member 81 and a truncated cone-shaped inserter 82. The threaded bolt 90 has an annular head 91, a contact face 92 and a threaded shank 100 which extends detachably from the annular head 91. The C-shaped resilient member 81 has a knurled external surface 811 and an inner tapered wall 813. The truncated cone-shaped inserter 82 has an axially extending threaded bore 822 formed therethrough.

The steerer tube 20 is secured relative to the head tube 10 for relative rotational movement. It will be appreciated that the head tube 10 is typically welded to the bicycle frame members 24 and 25. There is provided a lower bearing assembly 29 and an upper bearing assembly 50 between the steerer tube 20 and the head tube 10. The lower bearing assembly 29 has a first race 30 and a second race 34. The first race 30 may be press fit into the lower end of the head tube 10, so that the first race 30 pivots with the head tube 10. The second race 34 of the lower bearing assembly 29 may be press fit into the steerer tube 20, so that the second race 34 pivots with the steerer tube 20. A plurality of ball bearings 30' is enclosed between the first and second races 30 and 34, respectively.

Accordingly, the first and second races 30 and 34' are supported to rotate relative to each other by ball bearings 30'.

The upper bearing assembly 50 has an upper race 52 and a lower race 32 encasing a plurality of ball bearings 52' which enable the races 52 and 32 to rotate relative to each other. The upper race 52 is of layer inner diameter than the outer diameter of the steerer tube 20 compressing member 60 and a fastening member are employed to connect the upper race 52 to the steerer tube 20. The lower race 32 is connected to the head tube 10 by a press fit, for example.

An upper end of a steerer tube 20 which is employed in the preferred embodiment is not threaded. Therefore, a manufacturing step is reduced in the process for manufacturing the steerer tube 20. In assembly, the compression member 60 is disposed between a clearance 11 which is cooperatively defined by an upper race 52 of the bearing assembly 50 and the steerer tube 20. The inserter 82 is placed in the steerer tube 20, and the C-shaped resilient member 81 is press-fitted into the steerer tube 20 above the inserter 82. The threaded bolt 90 is disposed at a topmost end of the steerer tube 20 such that the threaded shank 100 extends into the steerer tube 20 to connect threadedly with the inserter in the threaded bore 822 of the latter.

When the threaded shank 100 is tightened, the inserter 82 is squeezed into the C-shaped resilient member 81 and radially forces the tapered wall 813 of the C-shaped resilient member 81 such that the latter expands to abut frictionally against the steerer tube 20. A connector 70 of the stem 78 which is disposed above the compression member 60 is compressed downward by the head 91 of the threaded bolt 90, thereby forcing the compression member 60 to abut the steerer tube 20 and the upper race 52 of the bearing assembly 50 so as to retain the steerer tube 20 rotatably and vertically relative to the head tube 10.

When the threads on the shank 100 and inside the inserter 82 wear out in time, the inserter 82 and the shank 100 can be easily replaced by removing the threaded bolt 90 from the steerer tube 20. There is no need to disassemble the connector 70 and the head tube 10 from the steerer tube 20. The objective and feature of the present invention is accordingly achieved.

While a preferred embodiment has been explained and described, it will be apparent that many changes and modifications can be made in the general construction and arrangement of the present invention without departing from the scope and spirit thereof. Therefore, it is desired that the present invention be not limited to the exact disclosure but only to the extent of the appended claims.

I claim:

1. A steering bearing assembly for a bicycle frame, comprising:
   a head tube connected to the bicycle frame;
   a steerer tube connected to a front wheel fork of the bicycle frame and passing through said head tube;
   a bearing assembly including a lower race connected to said head tube, an upper race connected to said steerer tube, and a plurality of ball bearings enclosed between said lower and upper races to permit relative rotation therebetween, the upper race having an inner diameter that is greater than an external diameter of said steerer tube, thereby forming a clearance between the upper race of said bearing assembly and said steerer tube;
   a compression member disposed in the clearance of the bearing assembly;
   a mounting stem for connecting a handle bar of the bicycle frame to said steerer tube, said mounting stem being disposed on said compression member and around said steerer tube;
   a C-shaped resilient member being press-fitted into said steerer tube and having an inner tapered wall;
   a truncated cone-shaped inserter inserted into said C-shaped resilient member, said inserter having an axially extending threaded bore; and
   a threaded bolt with a head provided on said steerer tube above said mounting stem and connected threadedly to said truncated con-shaped inserter in the threaded bore, radially expanding said C-shaped resilient member expanding radially when said threaded bolt is tightened so as to abut against said steerer tube and simultaneously force said mounting stem to compress said compression member against the upper race of the bearing assembly and said steerer tube, thereby retaining the compression member between said bearing assembly and the steerer tube to support the steerer tube vertically.

2. The steering bearing assembly as defined in claim 1, wherein said C-shaped resilient member has a knurled external surface to increase friction between said steerer tube and said resilient member.

* * * * *